(12) United States Patent
Wang et al.

(10) Patent No.: US 6,999,464 B2
(45) Date of Patent: Feb. 14, 2006

(54) METHOD OF SCALABLE NON-BLOCKING SHARED MEMORY OUTPUT-BUFFERED SWITCHING OF VARIABLE LENGTH DATA PACKETS FROM PLURALITIES OF PORTS AT FULL LINE RATE, AND APPARATUS THEREFOR

(75) Inventors: Xiaolin Wang, Concord, MA (US);
Satish Soman, Westboro, MA (US);
Subhasis Pal, Hopkinton, MA (US)

(73) Assignee: Axiowave Networks, Inc.,
Marlborough, MA (US)

( * ) Notice: Subject to any disclaimer, the term of this patent is extended or adjusted under 35 U.S.C. 154(b) by 960 days.

(21) Appl. No.: 09/941,144

(22) Filed: Aug. 28, 2001

(65) Prior Publication Data
US 2003/0043828 A1   Mar. 6, 2003

(51) Int. Cl.
*H04L 12/28* (2006.01)
*H04L 12/56* (2006.01)
(52) U.S. Cl. ............... 370/412; 370/413; 370/415; 370/417; 370/419

(58) Field of Classification Search ............... 370/412, 370/389–392, 468, 60, 84, 94.1, 99, 398, 370/413, 415, 419, 395.7, 395.71, 395.72, 370/422, 429, 382, 386, 379, 360, 363, 383, 370/395.4, 399, 351, 352–356, 367, 359, 370/374–378, 395.5, 395.6, 401, 458, 464–466, 370/522, 529, 535, 536, 542, 543, 544; 379/88.28, 379/356.01, 357.02, 357.05, 356, 56; 711/218, 711/200, 217, 220, 202, 219; 714/776.5, 714/702, 763, 773

See application file for complete search history.

(56) References Cited

U.S. PATENT DOCUMENTS

| | | | | |
|---|---|---|---|---|
| 4,644,529 A | * | 2/1987 | Amstutz et al. | ............ 370/422 |
| 4,748,618 A | * | 5/1988 | Brown et al. | ............... 370/419 |
| 6,621,828 B1 | * | 9/2003 | Field et al. | ................. 370/466 |
| 6,622,232 B1 | * | 9/2003 | Schroeder | .................... 711/219 |
| 6,822,960 B1 | * | 11/2004 | Manchester et al. | ........ 370/394 |

* cited by examiner

*Primary Examiner*—Wellington Chin
*Assistant Examiner*—Jamal A. Fox
(74) *Attorney, Agent, or Firm*—Rines and Rines

(57) ABSTRACT

A novel scalable-port non-blocking shared-memory output-buffered variable length queued data switching method and apparatus wherein successive data in each of a plurality of queues of data traffic is distributed to corresponding cells of each of successive memory channels in striped fashion across a shared memory space.

24 Claims, 2 Drawing Sheets

Write Path

Read Path

Figure 1:
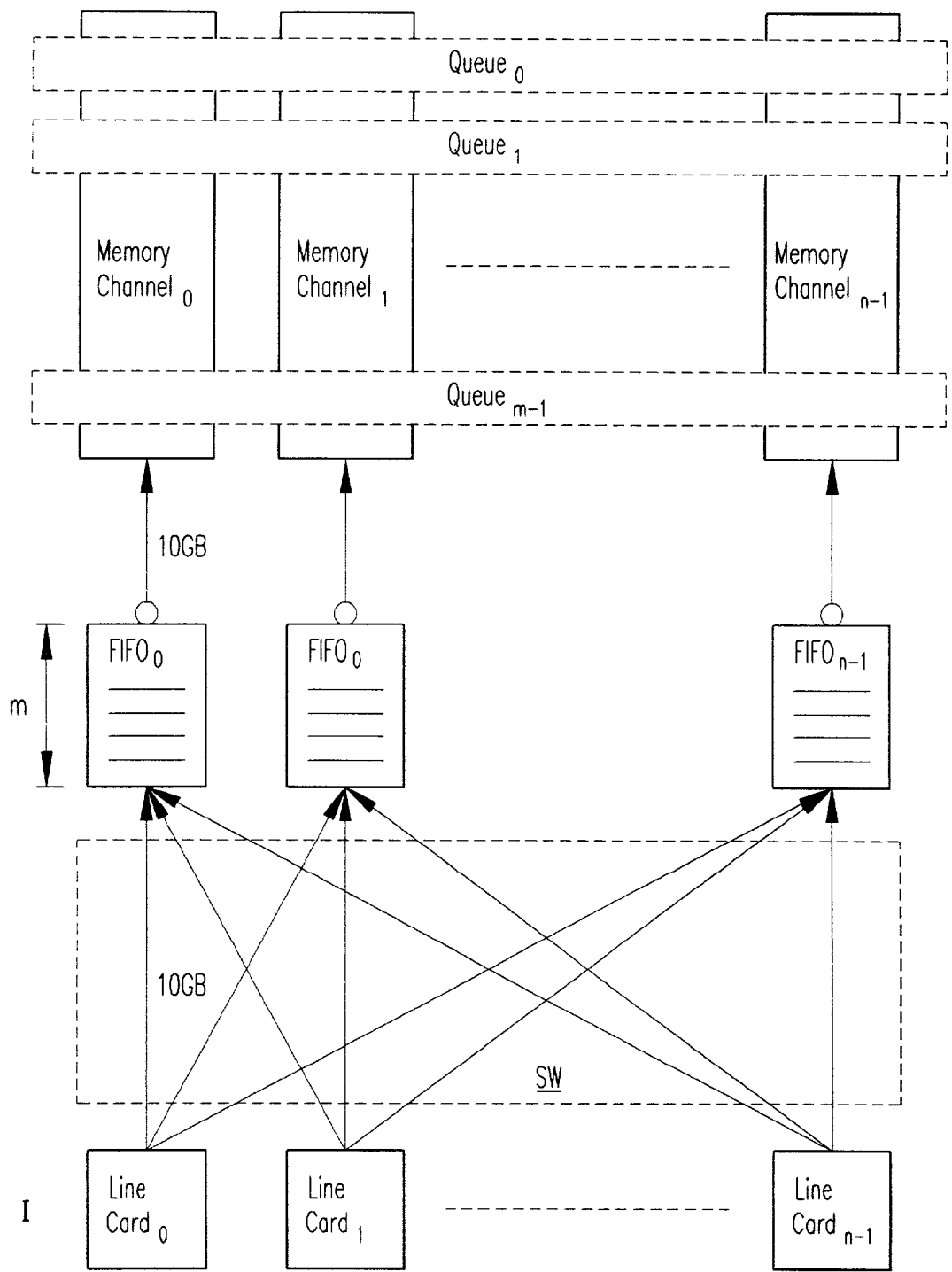

METHOD OF SCALABLE NON-BLOCKING SHARED MEMORY OUTPUT-BUFFERED SWITCHING OF VARIABLE LENGTH DATA PACKETS FROM PLURALITIES OF PORTS AT FULL LINE RATE, AND APPARATUS THEREFOR

FIELD

The present invention relates to communication data switching between pluralities of input and output ports, and, more particularly, to problems and limitations of present-day generally input-buffering system architectures and the like for the switching of variable-length data packets—limitations in the available number of ports for current data switching "speeds" and "feeds"; limitations with current data transmission delays, and in current available quality of service, including multiplexing jitter, interruptions, and in bandwidth, latency guarantees for particular data transmission services, and in obviating deleterious head-of-the-line blocking and non-scalability of architecture.

The usual "feed" today is 8 to 12 ports, but this can go up as time goes by. The "speed" today is, say, OC192 (which is 10 gigabytes), but it can also go to OC768 which is 40 gigabytes, and then beyond.

BACKGROUND

Prevalent products in the industry today can only support 8 to 12 OC192 ports, and they suffer from the other limitations mentioned above.

To endeavor to meet some of the quality of service requirements concurrently with data "speed" and "feed" requirements, the prior art has most commonly taken the before-described input buffering approach, wherein the input data is locally buffered on an input port that has no "knowledge" of what input data may also be present at other input ports and contending for the same output port destination. The input port merely blindly makes the request of the input buffered switch to direct its data to the particular output port; and this prior architecture thus has had to live with its classic problems of potential head-of-the-line (HOL) blocking and inability to guarantee delay and jitter in quality of service. The input-buffered systems, accordingly, have to put up with sometimes even unrealistic periods of time before data can make its way to the switch for enabling transmission to destination output ports.

The particular output-buffered approach of the invention, on the other hand, uses a central shared memory architecture comprised of a plurality of similar successive data memory channels defining a memory space, with fixed limited times of data distribution from the input ports successively into the successive memory cells of the successive memory channels, and in striped fashion across the memory space. This enables non-blocking shared memory output-buffered data switching, with the data stored across the memory channels uniformly. By so limiting the time of storing data from an input port in each successive memory channel, the problem is admirably solved of guaranteeing that data is written into memory in a non-blocking fashion across the memory space with bounded delay.

SUMMARY OF INVENTION

From one of its important viewpoints, accordingly, the invention embraces a method of receiving and outputting a plurality m of queues of data traffic streams to be switched from data traffic line card input ports to output ports, that comprises, providing a plurality n of similar successive data memory channels each having a number of memory cells defining a shared memory space assigned to the m queues; providing buffering for m memory cells, in front of each memory channel to receive and buffer data switched thereto from line card traffic streams, and providing sufficient buffering to absorb a burst from up to n line cards; and distributing successive data in each of the queues during fixed limited times only to corresponding successive cells of each of the successive memory channels and in striped fashion across the memory space, thereby providing non-blocking shared memory output-buffered data switching.

Preferred and best mode embodiments and architectural design features are hereinafter more fully detailed.

DRAWINGS

Figure 2:
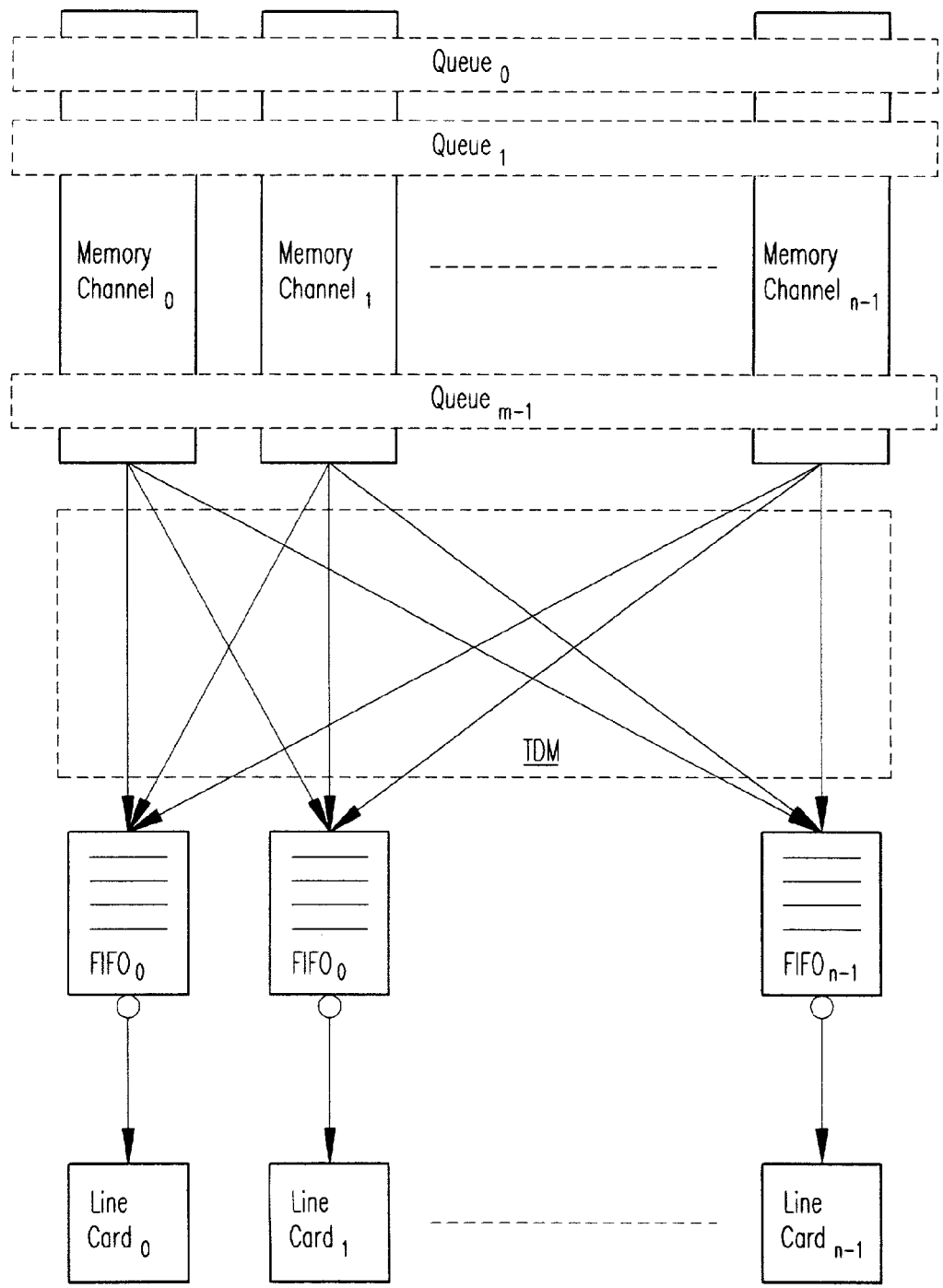

The invention will now be described in connection with the accompanying drawings, FIG. 1 of which is a combined generalized block and circuit diagram of a preferred architecture for practicing the data write-path method of the invention; and FIG. 2 is a similar diagram of read-out from the shared memory channel system of FIG. 1.

PREFERRED EMBODIMENT(S) OF THE INVENTION

Referring to FIG. 1, an illustrative preferred memory architecture for practicing the invention is shown having, for the write path, a plurality n of similar successive data memory channels or banks (say, for 256 megabytes times n storage channels), labeled Memory Channel$_o$ through memory channel$_{n-1}$ for storing and outputting m queues of variable length data traffic streams Queue$_o$ through Queue$_{m-1}$ from respective data traffic line cards Line Card$_o$ through Line Card$_{n-1}$ at input ports I, with, say, 10 Gigabits/sec.of bandwidth, and stored in the memory channels. Each of the n data memory channels is provided with a buffer having m memory cells, with the memory channels defining a shared memory space assigned to the m queues. The buffers are shown connected in front of each memory channel and are illustrated as in the form of first-in-first-out buffers FIFO$_o$, FIFO$_1$, . . . FIFO$_{n-1}$ to receive and buffer data switched thereto at SW from the line cards. In accordance with the invention, the buffers are designed to provide sufficient buffering to absorb a burst of data from up to n line cards; i.e. big enough to store data for m cells and to absorb a burst of, for example, OC192 traffic of variable length data packets from the line cards at the input ports I. [Example: 64 OC192 or 16 OC768 ports.] The maximum depth of each FIFO at the front of each memory channel is thus made equal to the number m of queues in the system.

Further in accordance with the invention, the data of the variable-length queues is applied or distributed only for fixed limited time(s) to corresponding successive cells of each of the successive memory channels so as to distribute these time-bounded inputs in striped fashion across the memory space of the channels. Within each period, every memory channel or bank receives data in about the same number of data cells, though arrival time is traffic dependent; and this, whether there is a data burst or the data is distributed equally throughout the period.

Two exemplary (and extreme condition) traffic scenarios may be considered. In the first, all traffic streams from the line cards may be destined to one queue. Since the cell addresses are assigned continually, all the memory channels will absorb a data burst. There will be no accumulation in any FIFO, provided the aggregation of bandwidth to memory is made to match the input bandwidth.

In a second extreme scenario, all the cells may happen to end on the same memory channel. The FIFO at the front of that memory channel will absorb the burst; and the next burst to come along, will move to the next memory channel.

This demonstrates that with the proper sizing of the FIFOs to absorb any data burst at the front of each memory channel, the burst problem is well solved and with a bounded latency. As above explained, moreover, the depth of the FIFOs is set at about the number of queues supported by the system, and the aggregated bandwidth between the FIFOs in the memory channels is adjusted, as indicated previously, at least to match the input bandwidth.

Through the invention, accordingly, not only is non-blocking shared memory output-buffered data switched, but the bandwidth can be assigned and guaranteed to designated users. If a predetermined assigned depth is exceeded by a user, such excess is stored in available unoccupied shared memory and may be additionally charged for, to that user.

FIG. 2 illustrates the read path architecture of the invention for use with the write path system of FIG. 1, providing for every line card, a corresponding FIFO that is able to draw from the shared memory and at the full bandwidth of the shared memory in a TDM type fashion. In the read operation, it is important that the bandwidths are completely balanced to each line card with equal access to the shared memory system, wherein each line card gets its fixed limited time slot to read out the required amount of data to satisfy the bandwidth needs. As an example, Line Card$_o$ and FIFO$_o$ of FIG. 2 read from the shared memory the full bandwidth of the shared memory going up the FIFO$_o$; the Line Card$_1$ and its corresponding FIFO, will get its share of the full bandwidth from the shared memory, and so on--each line card getting each required share of the shared memory bank data.

Further modifications will occur to those skilled in this art, and such are considered to fall within the spirit and scope of the invention as defined in the appended claims.

What is claimed is:

1. A method of receiving and outputting a plurality m of queues of data traffic streams to be switched from data traffic line card input ports to output ports, that comprises, providing a plurality n of similar successive data memory channels each having a number of memory cells defining a shared memory space assigned to the m queues; providing buffering for m memory cells in front of each memory channel to receive and buffer data switched thereto from line card traffic streams, and providing sufficient buffering to absorb a burst from up to n line cards; and distributing successive data in each of the queues during fixed limited times only to corresponding successive cells of each of the successive memory channels and in striped fashion across the memory space, thereby providing non-blocking shared memory output-buffered data switching.

2. The method of claim 1 wherein, in read mode, each line card draws data from storage in the shared memory through a corresponding buffer and in a fixed limited time slot to read out the required amount of data to satisfy its bandwidth needs.

3. The method of claim 1 wherein the buffering is provided by FIFO buffers each sized to store m cells of data.

4. The method of claim 3 wherein the aggregation of bandwidth to memory is adjusted for matching the data input bandwidth.

5. The method of claim 4 wherein the cell addresses are assigned continually such that the memory channels absorb said burst.

6. The method of claim 5 wherein in the event that all traffic streams from the line card ports are directed to one queue, accumulation of data is prevented in any FIFO by said matching.

7. The method of claim 5 wherein, in the event that all cells storing different queues happen to end on the same memory channel, the occurrence of a burst is absorbed on the FIFO at the front end of that channel.

8. The method of claim 7 wherein a subsequent burst is directed to the next successive memory channel of the memory space.

9. The method of claim 3 wherein the depth of each FIFO is adjusted to about the number m of queues.

10. The method of claim 2 wherein each buffer is a FIFO buffer sized for m cells of data.

11. The method of claim 3 wherein the number of input and output ports is scalable.

12. The method of claim 3 wherein 256 megabytes×n memory channels are employed.

13. A scalable-port, non-blocking, shared-memory output-buffered variable-length queued data switch wherein a data write path is provided having, in combination, a plurality of data line card input ports connected to a switch for switching m queues of data to a shared memory space assigned to the queues and comprising a plurality n of similar successive data memory channels, each having memory cells; a plurality n of buffers each fed data by the switch and each gated to feed a corresponding memory channel but only for fixed limited times; each of the buffers being provided with sufficient buffering to absorb a burst from up to n line cards; and means for distributing the successively gated data in each of the queues to corresponding successive cells of each of the successive memory channels in striped fashion across the memory space, thereby to provide non-blocking, shared-memory output-buffered data switching.

14. The shared memory output-buffered switch of claim 13 wherein a read path is provided for each line card to draw data from storage in the shared memory through a corresponding buffer and in a fixed limited time slot to read out the required amount of data to satisfy its bandwidth needs.

15. The output-buffered switch of claim 13 wherein the buffering is provided by FIFO buffers each sized to store m cells of data.

16. The output-buffered switch of claim 15 wherein the aggregation of bandwidth to memory is adjusted for matching the data input bandwidth.

17. The output-buffered switch of claim 16 wherein means is provided for continually assigning the cell addresses such that the memory channels absorb said burst.

18. The output-buffered switch of claim 17 wherein, in the event that all traffic streams from the line card ports are directed to one queue, means is provided for preventing accumulation of data in any FIFO.

19. The output-buffered switch of claim 17 wherein, in the event that all cells storing different queues happen to end on the same memory channel, the occurrence of a burst is absorbed on the FIFO at the front end of that channel.

20. The output-buffered switch of claim 19 wherein means is provided for directing a subsequent burst to the next successive memory channel.

21. The output-buffered switch of claim 15 wherein the depth of each FIFO is adjusted to about the number m of queues.

22. The shared memory output-buffered switch system of claim 14 wherein each buffer is a FIFO buffer sized for m cells of data.

23. The shared memory output-buffered switch system of claim 22 wherein the line card drawing from shared memory is effected in a TDM type fashion.

24. The method of claim 2 wherein the line card drawing from shared memory is effected in a TDM type fashion.

* * * * *